United States Patent [19]
Helms

[11] Patent Number: 4,958,437
[45] Date of Patent: Sep. 25, 1990

[54] COORDINATE MEASURING MACHINE WITH VIBRATION DAMPER

[75] Inventor: Israel F. Helms, Coventry, R.I.

[73] Assignee: Brown & Sharpe Manufacturing Company, North Kingstown, R.I.

[21] Appl. No.: 309,692

[22] Filed: Feb. 10, 1989

[51] Int. Cl.$^5$ .................. G01B 21/04; G01B 5/03; G01B 7/03

[52] U.S. Cl. ......................... 33/503; 33/1 M; 33/556

[58] Field of Search ............ 33/503, 504, 505, 1 M, 33/556, 555, 558; 248/636, 638, 559, 562; 188/378, 379, 380; 267/137

[56] References Cited

U.S. PATENT DOCUMENTS

| 4,282,938 | 8/1981 | Minamidate | 173/162.2 |
| 4,594,791 | 6/1986 | Brandstetter | 33/503 |
| 4,697,781 | 10/1987 | Hamano et al. | 248/559 |
| 4,706,788 | 11/1987 | Inman et al. | 248/636 |
| 4,722,946 | 2/1988 | Hostettler | 528/59 |
| 4,798,006 | 1/1989 | Barnaby | 33/503 |

FOREIGN PATENT DOCUMENTS 0140079  2/1980  Fed. Rep. of Germany ....... 33/1 M

OTHER PUBLICATIONS

Harris and Crede, "Shock and Vibration Handbook", 2d Ed, 1976.

Primary Examiner—William A. Cuchlinski, Jr.
Assistant Examiner—Christopher W. Fulton
Attorney, Agent, or Firm—Wolf, Greenfield & Sacks

[57] ABSTRACT

A vibration damper disposed in a gantry-type coordinate measuring machine. The vibration damper includes a block having a substantial mass suspended from the moving gantry-type structure by highly energy absorbent pads having a low rebound resilience. The vibration damper is preferably spaced from the point at which the gantry-type structure is coupled to the drive therefor.

13 Claims, 2 Drawing Sheets

COORDINATE MEASURING MACHINE WITH VIBRATION DAMPER

FIELD OF THE INVENTION

This invention relates generally to vibration dampers for machines with high precision positioning mechanisms movable along three coordinate axes, and more particularly, to coordinate measuring machine having a vibration damper for providing high accuracy measurement of precision parts.

BACKGROUND OF THE INVENTION

Machines with high precision positioning mechanisms are used in many industries for accurately measuring the tolerance of machine parts and other components as well as for positioning tools for performing highly precise operations on parts and components. Typically, a tool or a touch sensitive probe for position measurement is mounted on the end of a support structure that allows the probe or tool to be moved in three dimensions by selective translation along three orthogonal axes.

Gantry-type support structures are commonly used in such machines, particularly coordinate measuring machines. Such a gantry-type structure typically includes a base, a table resting on the base, a gantry structure which rides on parallel, spaced rails supported by the base and a carriage which rides on the gantry structure. A vertically movable element, typically referred to a Z-rail, includes a touch sensitive probe disposed on the lower end thereof, and the Z-rail moves vertically with respect to the carriage, while the carriage moves horizontally along a rail disposed on the gantry structure. Gas bearings are used to facilitate the movement of the gantry structure on its associated rails. Typically, the gantry structure is driven only along one rail. The probe disposed on the end of the Z-rail therefore can be moved in three dimensions to be positioned at any point on the table for measuring a position on a part to be tested.

Electronic sensors are provided on each rail for sensing the position of the probe or tool in terms of its X, Y and Z coordinates. Typically, a microcomputer is provided within the device which causes the probe to be moved through a series of specified X, Y and Z locations for a specified period of time to either measure or work on the part resting on the table.

In use, the gantry-type structure is rapidly accelerated and decelerated to deliver the probe or tool to the point at which it is to perform its work or measurement. Such rapid movements are necessary so that measurements can be taken rapidly and so that the period for testing a part is not intolerably long. In part because such gantry-type structures are generally driven only along one rail, vibrations can result in the structure because of the structure's inherent inertia. A torque is produced about the point at which the drive is coupled to the gantry-type structure, and it may be assumed for most purposes that the torque is applied at the center of gravity of the gantry-type structure and has a moment arm which extends from the point of coupling of the drive to the structure to the center of gravity thereof. Since the gantry-type structure has a certain elasticity, and since continued movement of the structure is resisted by the drive, and by the bearings which maintain the proper positioning of the structure, this torque causes vibrations to be set up in the gantry about the point at which the gantry is coupled to the drive. These vibrations are then transferred to the bearings, which can act like a spring. Obviously, it is desirable to damp the vibrations out of the system as quickly as possible to avoid measurement errors. For high precision coordinate measuring machines, it is essential that the measurements be taken when no vibrations are present, so that the precise alignment can be maintained. The time required for the vibrations in the support structure to damp out of the system is termed the settling time.

Certain characteristics of a gantry-type positioning machine have a substantial effect on the amplitude and frequency of the vibrations in the structure. Very soft or dynamically marginal air bearings tend to increase the amplitude of vibration and settling time of the system. Also, if the bearings are unstable, particularly at a resonant frequency of the gantry-type structure, the settling time will be increased. The amplitude of the vibrations and the length of the settling time also depend on the stiffness of the gantry structure itself, as well as on the distance of the center of mass of the gantry from the X axis drive. The amplitude of the vibrations will increase as the carriage is moved along the Y-rail away from the X axis drive or as the Z-rail is moved away from the X axis drive. This increase in amplitude occurs because, as the distance between the center of mass of the gantry and the X axis drive increases, the moment arm of the force and thus the applied torque increases.

Therefore, it is an object of the present invention to reduce vibrations in a gantry-type machine having a high precision positioning mechanism.

It is another object of the present invention to reduce vibrations in a coordinate measuring machine.

It is a further object of the present invention to provide a vibration damper for a coordinate measuring machine.

It is another further object of the present invention to reduce the settling time of vibrations in a gantry-type structure which are induced by acceleration and deceleration of the machine components during rapid measurements.

It is yet another object of the present invention to improve the throughput of a coordinate measuring machine.

SUMMARY OF THE INVENTION

According to the present invention, these and other objects and advantages are achieved by a vibration damper for a machine having a three axis, high precision positioning mechanism, such as a coordinate measuring machine. This damper is particularly suited for a machine having a gantry-type structure which includes a horizontally movable gantry, a carriage which rides horizontally on the gantry and a third rail which is vertically movable with respect to the carriage.

The vibration damper of this invention includes a block having a substantial mass suspended from the gantry and supported by one or more shock absorbing pads. The combination of the block and the shock absorbing pads causes the mass to vibrate roughly 180° out of phase with respect to the gantry, thereby applying a force to the gantry in a direction opposite of the direction of the applied vibrational force. This action helps cancel out the vibrational motion of the gantry. The vibrations caused in the gantry by the rapid acceleration and deceleration of the gantry along the X axis are therefore absorbed by the shock absorbing pads, and the vibrational energy is dissipated as heat.

Preferably, the vibration damper is mounted at a point that is displaced from the X axis drive coupling point in both the Y and Z directions, so that it will cancel out vibrations having moment arms in both the Y and Z directions. In a preferred embodiment, the block is mounted as far from the X-axis drive in the Y and Z directions as is practical to maximize its moment arm about the coupling point between the X-axis drive and the gantry structure.

In a preferred embodiment, the block is suspended from a metal plate in non-contacting relation with the gantry. The plate rests on shock absorbing pads. The shock absorbing pads are preferably constructed of a viscoelastic foam or elastomer which has high energy absorbency and low resiliency. A preferred example is a polyurethane foam having a rebound resilience less than 20%.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE INVENTION

In the following discussion, the vibration damper of the present invention is described with particular reference to a coordinate measuring machine. However, it should be understood that this invention has equal applicability to other high precision positioning mechanisms that have gantry-type structures, such as tooling machines.

Figure 1:
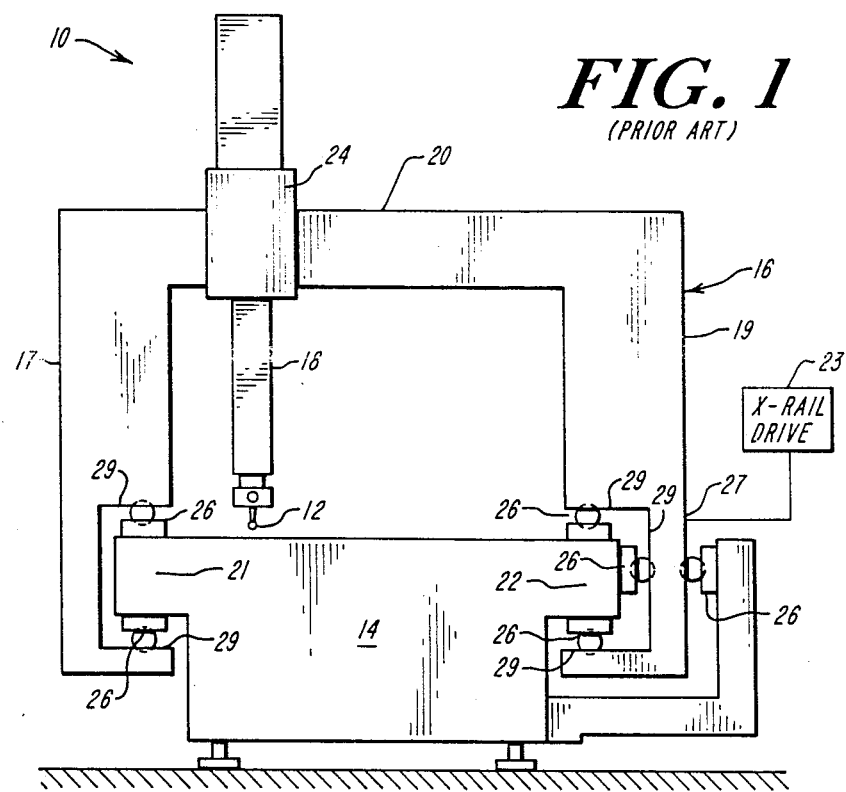
FIG. 1 is a schematic representation of a prior art three axis coordinate measuring machine.

FIG. 1 shows a typical prior art three axis coordinate measuring machine 10 which includes a gantry-type structure 16, a table 14, on which a part to be tested is placed, a first X-rail 21, a second X-rail 22, a Y-rail 20, a carriage 24 and a Z-rail 18 coupled to carriage 24. A touch sensitive probe 12 is mounted on the end of Z-rail 18. Structure 16 is formed of supports 17 and 19 and Y-rail 20 which forms a bridge between supports 17 and 19. Supports 17 and 19 ride on and are slidably coupled to X-rails 21 and 22 respectively to allow movement of structure 16 in a first direction (the X-direction). Carriage 24 is slidably coupled to Y-rail 20 to allow movement in a second direction (the Y direction), and Z-rail 18 is slidably coupled to carriage 24 to allow movement in a third direction (the Z-direction). X-rails 21 and 22, Y-rail 20 and Z-rail 18 each are orthogonal to the other two rails. As a result, probe 12 can be moved in three dimensions by selective translation along the three orthogonal axes. For purposes of this discussion, the Z-axis is considered the vertical axis in FIG. 1, the Y-axis runs horizontally across the page and the X axis is perpendicular to the page.

Z-rail 18 moves orthogonally to the plane defined by the X and Y-rails under the control of a first motorized drive (not shown) contained within carriage 24. The entire Z-rail structure, which includes probe 12, Z-rail 18 and carriage 24, is movable in the Y direction by means of a second motorized Y-rail drive (not shown) for moving the Z-rail structure along rail 20. Finally, the entire support structure 16, and the probe 12, Z-rail 18, and carriage 24 are driven together along X-rails 21 and 22 in the X direction by X-rail drive 23. X-rail drive 23, the Y-rail drive and the Z-rail drive each is conventional and may be a gear drive, a rack and pinion system or any other suitable drive. Structure 16 is coupled to the X-rail drive 23 only at point 27 on X-rail 22, as shown in FIG. 1.

Air bearings 26 are provided between bearing surfaces 29 on structure 16 and opposed bearing surfaces on X-rails 21 and 22 to allow structure 16 to move in a relatively frictionless manner with respect to the X-rails and to allow the gantry to be accelerated and moved quickly and easily to a new position after a measurement is taken. Air bearings 26 maintain structure 16 accurately positioned relative to table 14 to prevent the introduction of errors in measurements in the Y and Z axis directions caused by misalignment of structure 16. The air bearing gaps between bearing surfaces on X-rails 21 and 22 and opposed bearing surfaces 29 in structure 16, which are exaggerated for purposes of illustration in FIG. 1, are preferably very narrow and are of the order of less than 1/1000 of an inch. Narrow air bearing gaps are desirable because they provide high stiffness and therefore reduce vibration when structure 16 is accelerated to a new position. Carriage 24 also rides on air bearings (not shown) along Y-rail 20, and Z-rail 18 rides on air bearings (not shown) disposed within carriage 24 to provide relatively frictionless movement and to maintain alignment.

Generally, measurements are made of a part under test by bringing probe 12 into contact with a reference point on the part. The positions of structure 16 on X-rails, carriage 24 on Y-rail 20 and Z-rail with respect to carriage 24 are electronically sensed and translated into digital information. The probe is then moved to other points on the part under test and the X, Y and Z coordinate information is again digitally recorded for each point. The coordinate information is then assimilated, such as by a microcomputer (not shown) within the coordinate measuring machine, to determine if the part meets predetermined specifications.

The acceleration and deceleration of the gantry 16 by the X-rail drive 23 causes vibrations of structure 16 about an axis which passes through point 27 where structure 16 is fixed to X-rail drive 23 Since the entire structure 16 can move in the X direction, i.e. in and out of the page, point 27 is not fixed in the X direction but only in the Y Z plane, i.e. the plane of the page.

The inertia of structure 16 in motion or at rest causes a force to be applied to structure 16 as structure 16 is brought to rest or as it is accelerated respectively. When decelerating, this force is determined from the momentum of the structure. This application of force causes a torque to be applied to structure 16 about point 27. The torque applied about point 27, constitutes an infinite number of forces acting on all parts of the structure about moment arms of varying lengths. However, the total torque on structure 16 can be considered as being a single torque applied to structure 16 at its center of mass and having a moment arm measured from point 27 to the center of mass. Since carriage 24, Z-rail 18 and probe 12 comprise a substantial fraction of the total mass of structure 16, as probe 12 is moved farther away from point 27 in the Y and Z directions, the distance between point 27 and the center of mass of structure 16 also increases in the Y and Z directions. Since the torque applied about point 27 is the product of the applied force and the moment arm of the force, obviously the torque is the greatest when probe 12 is at its farthest point from point 27.

Because of the elasticity of structure 16 and because further movement of structure 16 is resisted by X-rail drive and the bearings 26, vibrations are produced in structure 16 about point 27. These vibrations eventually dissipate as they are converted to heat. The vibrations have components in the plane defined by the X and Y-axis as well as in the plane defined by the X and Z-axis, but not in the plane defined by the Y and Z axis, since the force exerted on structure 16 is perpendicular to the Y Z plane (i.e. parallel to the X axis). It takes a finite amount of time for the vibrations created by the force in the X-axis direction to damp out of the system to allow accurate and steady measurement of the part under test. This time is referred to as the settling time.

Figure 3:
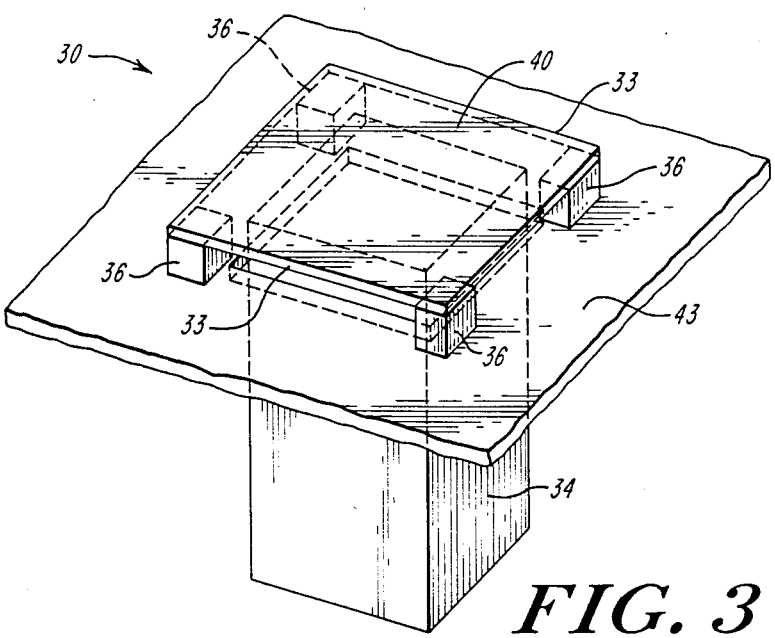
FIG. 3 is a perspective view of the vibration damper of this invention.
Figure 2:
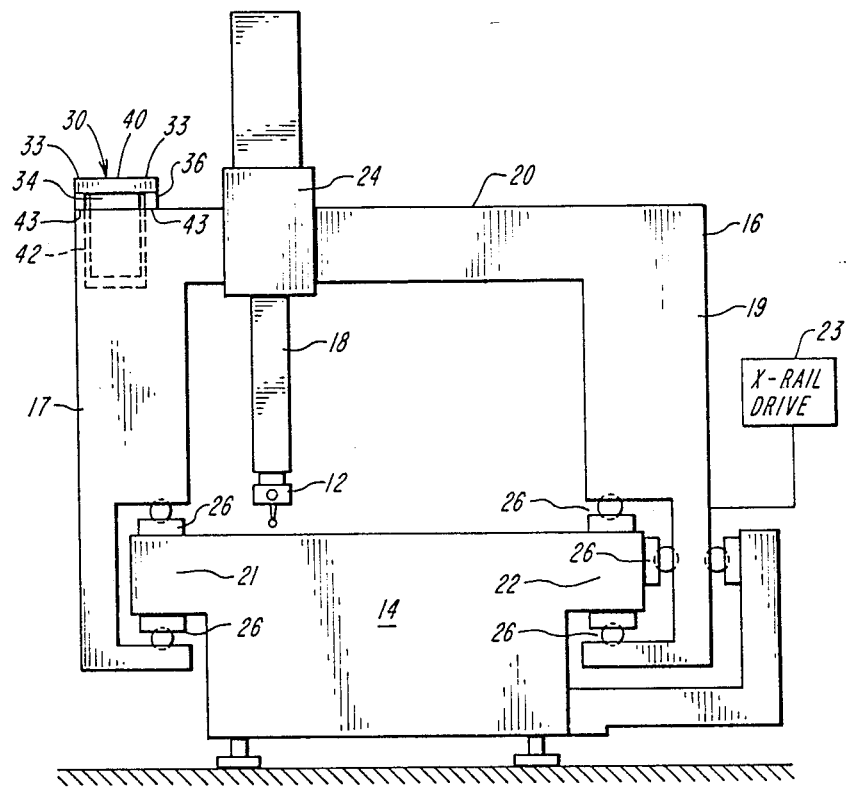
FIG. 2 is a schematic representation of a three axis coordinate measuring machine embodying the vibration damper of the present invention.

Vibration damper 30 of the present invention will now be described with particular reference to FIGS. 2 and 3. FIG. 2 shows the invention as used in conjunction with a gantry-type coordinate measuring machine as shown in FIG. 1. Like numbers are used for like parts, where possible. As shown in FIG. 2, vibration damper 30 is disposed on structure 16 at a point spaced from X-rail drive 23.

Damper 30 typically comprises plate 40, block 34 having a substantial mass and shock absorbing pads 36. Block 34 is preferably rigidly attached to the plate 40 and is suspended therefrom through a corresponding hole 42 in structure 16 so that the center of gravity of block 34 is disposed below plate 40. Block 34 can be formed of any solid, heavy material and can be of any shape. Block 34 typically is an elongated block of lead, iron or steel. Plate 40 must be rigid and typically is formed of steel. Plate 40 has a lateral extent greater than the dimensions of hole 42 so that edges 33 of plate 40 overlie portions 43 of Y-rail 20 on structure 16. Pads 36 are disposed between the undersurfaces of edges 33 of plate 40 and portions 43. Thus, plate 40 and block 34 are supported by pads 36 so that block 34 is in non-contacting relation with structure 16 or with the inside surfaces of hole 42. Four pads 36 are shown. However, any number of pads 36 may be used having any desired shape, so long as pads 36 support mass 34 and plate 40 in non-contacting relation with structure 16. Additional pads 36 may also be placed along the vertical walls of block 34 to ensure that block 34 never directly touches any part of structure 16 of the interior surfaces of hole 41. Block 34 preferably is mounted at or above the center of mass for structure 16. Preferably, block 34 has a weight which is in the range of about 50% to about 100% of the combined weight of support 17, Y-rail 20, carriage 24 and Z-rail 18. Each of shock absorbing pads 36 is rigidly attached, such as by glue, at its top to edges 33 of plate 40 and, at its bottom, to portions 43 of Y-rail 20.

Pads 36 are constructed of a low resiliency, highly energy absorbent material While any such material would be acceptable, a polyurethane viscoelastic foam or elastomer having relatively high hysteresis (good energy absorbency) and low rebound velocity is preferred. An acceptable foam or elastomer material is manufactured in the manner described in U.S. Pat. No. 4,722,946 which is incorporated herein by reference. A commercially available foam or elastomer made in accordance with U.S. Pat. No. 4,722,946 is sold under the trademark VISCOLITE by Polymer Dynamics, Inc. of Lehiqh Valley, Pa. A preferred material has a Shore "00" hardness as measured according to ASTM D2240 of 50 00, an elongation at break of 340% and a tensile strength of 95 psi. If a polyurethane foam such as VISCOLITE is used for pads 36, a thickness of about one half inch is preferred. However, any polymer having high energy absorbency and low rebound resiliency, i.e. less than 20% resiliency, as measured by the pendulum method as described by Zwick (DIN 53512) is acceptable.

The inertia of block 34 during acceleration and deceleration of structure 16 tends to create vibrations in damper 30 which are roughly 180° out of phase with vibrations in structure 16. This out-of-phase relation results from a delay with respect to structure 16 in the application of torque by block 34 because of the inherent elongation characteristics of pads 36 which cause block 34 to stop moving during deceleration or start moving during acceleration only after pads 36 reach their limit of stretching or elongation in response to the inertia of block 34. It is desirable to maximize the moment arm of damper 30 about point 27 because the longer the moment arm, the greater is the counter torque applied to structure 16 by block 34, and the smaller is the force that is required to cancel out the vibrations of structure 16, and thus the less is the weight required for block 34. Damper 30 has its greatest damping effect if it is positioned as far away from point 27 in the Y and Z-axis directions as is practical. In a preferred embodiment, damper 30 overlies X-rail 21.

In operation, when structure 16 is rapidly accelerated and moved to a new point in the X-axis direction, structure 16 achieves a momentum which is a function of the mass of structure 16 and its velocity. Because of inertia, a torque is imparted to structure 16 about point 27 as structure 16 is decelerated by the action of X-rail drive 23 and bearings 26. This torque is a function of the acquired momentum of the structure 16 and of the distance of its center of gravity from point 27. Damper 30 also achieves a certain momentum during movement of structure 16. Due to inertia, during deceleration damper 30 also applies a torque to structure 16 about point 27. However, there is a delay in the application of torque to structure 16 by damper 30 because of the flexibility of pads 36. Pads 36 tend to elongate or stretch during deceleration, allowing block 34 to travel in the same direction for a slightly longer period of time than for structure 16. Eventually, pads 36 restrain further motion of block 34, but only after motion of structure 16 has been restrained by bearings 26 and X-rail drive 23. As a result, vibrations are set up in structure 16, as well as in damper 30, because of the torque applied by structure 16 and by damper 30 respectively, because of the elasticity of structure 16 and because of the resistance to further movement by bearings 26 and X-rail drive 23. However, because of the delayed application of torque by block 34, there is a phase delay between the vibrations of damper 30 and the vibrations of structure 16. Assuming that the resulting vibrations in block 34 of damper 30 and structure 16 are roughly sinusoidal, while the vibration of structure 16 has passed through the first half cycle of the sinusoid and is moving in the direction of the second half cycle, the vibration of block 34 is still in the first half cycle of the sinusoid. Therefore, the vibrations resulting from the torque applied by structure 16 and the vibrations resulting from the torque applied by block 34 are roughly 180° out of phase and tend to cancel each other out by deforming pads 36. The torque applied by the mass of structure 16 is greater than the torque applied by smaller block 34, so that the vibrations are not immediately reduced to zero. However, the result is a rapid damping of the vibrations in structure 16 by block 34, thus decreasing substantially the settling time of the system. Pads 36 thus absorb vibrations and the vast majority of the resulting vibrational energy is quickly dissipated as heat in pads 36.

Figure 4:
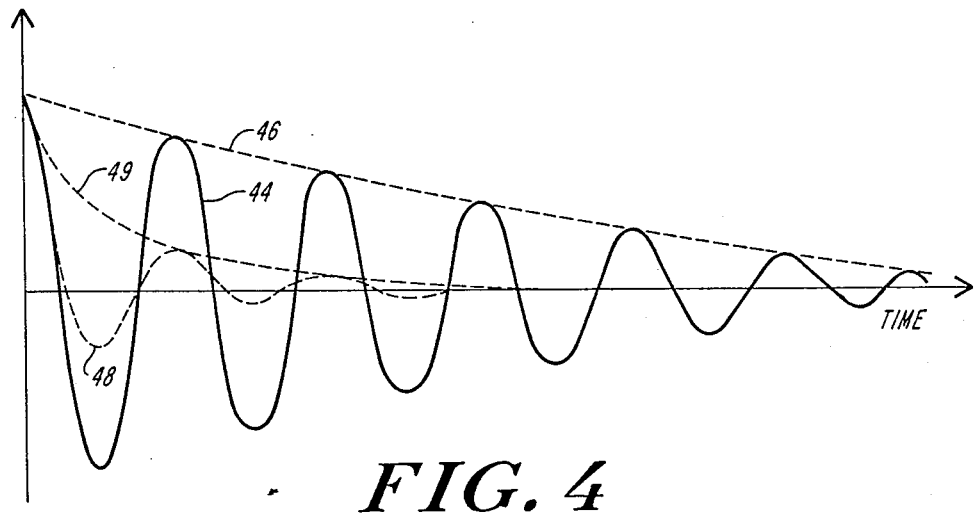
FIG. 4 is a graph showing a plot of amplitude of vibration versus time for the machine of the present invention and for a prior art machine.

FIG. 4 illustrates the approximate improvement in vibration settling time achieved by the addition of the damper 30 of the present invention to a coordinate measuring machine of the prior art. In FIG. 4, the vertical axis represents the amplitude of the vibrations while the horizontal axis represents elapsed time. Curve 44 illustrates the approximately sinusoidal vibration of the prior art gantry structure 16 about an axis in the X direction passing through point 27. Curve 46 is the envelope of the amplitude of the vibration shown in curve 44. Curve 48 illustrates the approximately sinusoidal vibration of the same prior art gantry structure 16 with the addition of the damper 30 of the present invention. Curve 49 is the envelope of curve 48. As shown by a comparison of curves 46 and 49, the vibration damper of the present invention substantially reduces the settling time of structure 16.

Pads 36 are deformable in any direction, so that damper 30 not only tends to cancel out vibrations having moment arms about point 27 but also tends to cancel out any vibration in the system caused by rapid acceleration and deceleration of the Y-rail drive and Z-rail drive. The operation with respect to the Y-rail and Z-rail drives is the same as that for the X-rail drive. The vibrations caused by the Y and Z-rail drives are much less significant than those caused by the X-rail drive and the measurement errors produced thereby are correspondingly smaller. The vibrations are less significant because the mass which is being moved by the Y and Z-rail drives is much less than the mass being moved by the X-rail drive, and the moment arm about which a torque is being applied is very small because of the small offset of the center of gravity from the point at which the Y and Z axis drives are coupled to the carriage 24 and Z-rail 18 respectively.

Although block 34, plate 40 and pads 36 are all shown as having rectangular configurations, these elements may have any shape desired, including a circular or cylindrical shape, so long as the intended function is achieved. While pads 36 are shown disposed between plate 40 and portions 43, they can also be positioned between plate 40 and other supporting surfaces on structure 16, or between block 34 and portions of structure 16. Also, block 34 could be suspended from pads 36 which are attached to structure 16.

Having described one preferred embodiment of the present invention it should be obvious to those skilled in the art that various modifications and alterations are possible without departing from the scope of the invention. Such obvious modifications and alterations are intended to be included within the scope of the invention which is not to be limited by the above discussion of a single preferred embodiment. The only limitations upon the scope of the invention are defined by the appended claims and their equivalents.

What is claimed is:

1. A vibration damper for a precision positioning apparatus including a base, a pair of spaced rails disposed on the base, two supports, one support riding on each of said rails, a bridge extending between the supports, and means associated with one of said rails for driving the bridge and supports along said rails, said vibration damper comprising:
   a block having a substantial mass; and
   means for supporting said block only on one side of said block above a center of gravity of said block at a fixed position spaced from the driving means, said supporting means comprising a low resiliency material having a rebound resilience less than 20 percent as measured by the pendulum method.

2. A vibration damper as recited in claim 1 wherein said supporting means comprises a foam pad.

3. A vibration damper as recited in claim 1 wherein said supporting means is a viscoelastic polyurethane foam material having a low rebound resilience.

4. A vibration damper as recited in claim 1 wherein said block is disposed at a point on said bridge overlying an X-rail other than said one of said rails.

5. A vibration damper as recited in claim 1 wherein said supporting means supports said block in non-contacting relation with said precision positioning apparatus.

6. A coordinate measuring machine comprising:
   a base;
   a table disposed on said base for supporting a part to be measured;
   a pair of spaced, parallel X-rails mounted on said base;
   two support members, one support member being slidable along each of said two X-rails;
   a Y-rail aligned in a direction generally orthogonal to said X-rails and extending between said support members;
   a carriage slidable along said Y-rail;
   a Z-rail mounted on said carriage in slidable relation therewith in a direction generally normal to said Y-rail and to said X-rail;
   means associated with one of said X-rails for driving said support members and said Y-rail along said X-rails; and
   means disposed on said Y-rail in spaced relation with said driving means for dampening vibrations of said support members and said Y-rail resulting from acceleration and deceleration of said support members by said driving means, said dampening means comprising a block having a substantial mass and being supported only on one side of said block above a center of gravity of said block by a low resiliency material, said block having a weight in the range of from about 50 percent to about 100 percent of the combined weight of one of said support members, said Y-rail, said carriage and said Z-rail.

7. A coordinate measuring machine as recited in claim 6 wherein said dampening means is disposed generally in overlying relationship with an X-rail other than said one of said X-rails.

8. A coordinate measuring machine as recited in claim 6 wherein said low resiliency material has a rebound resilience less than 20% as measured by the pendulum method.

9. A vibration damper for a precision positioning apparatus including a base, a pair of spaced rails disposed on the base, two supports, one support riding on each of said rails, a bridge extending between the supports, and means associated with one of said rails for driving eh bridge and supports along said rails, said vibration damper comprising:
 a block having a substantial mass; and
 means for supporting said block on said bridge at a position spaced from the driving means, said supporting means comprising:
  a plate attached to an upper end of said block, said plate having portions extending laterally beyond outer edges of said block to overlie a surface on said bridge; and
  a viscoelastic, low resiliency pad disposed between said laterally extending portions of said plate and said surface of said bridge for supporting said laterally extending portions of said plate in spaced relation with said surface of said bridge.

10. A vibration damper as recited in claim 9 wherein said low resiliency pad has a rebound resilience less than 20% as measured by the pendulum method.

11. A coordinate measuring machine comprising;
 a base;
 a table disposed on said base for supporting a part to be measured
 a pair of spaced, parallel X-rails mounted on said base;
 two support members, one support member being slidable along each of said two X-rails;
 a Y-rail aligned in a direction generally orthogonal to said X-rails and extending between said support members;
 a carriage slidable along said Y-rail;
 a Z-rail mounted on said carriage in slidable relation therewith in a direction generally normal to said Y-rail and to said X-rails;
 means associated with one of said X-rails for driving said support members and said Y-rail along said X-rails; and
 means disposed on said Y-rail in spaced relation with said driving means for dampening vibrations of said support members and said Y-rail resulting from acceleration and deceleration of said support members by said driving means, said dampening means comprising:
  a block having a substantial mass, said block having a weight in the range of from about 50 percent to about 100 percent of the combined weight of one of said support members, said Y-rail, said carriage and Z-rail;
  means secured to said block for supporting said block only on one side of said block above a center of gravity of said block; and
  a viscoelastic, low resiliency pad disposed between said supporting means and surfaces of said Y-rail for suspending said block in non-contacting relationship with said Y-rail.

12. A coordinate measuring machine as recited in claim 11 wherein said supporting means comprises a plate affixed to an upper end of said block and having lateral portions thereof extending beyond lateral surfaces of said block, and wherein said pad is disposed between said lateral portions of said plate and confronting surfaces of said Y-rail.

13. A coordinate measuring machine as recited in claim 11 wherein said low resiliency pad has a rebound resilience less than 20% as measured by the pendulum method.

* * * * *